Oct. 26, 1954 N. C. ANDERSON 2,692,574

APPARATUS FOR PRODUCING PHOTOCONDUCTIVE CELLS

Filed June 28, 1951 2 Sheets-Sheet 1

INVENTOR
N. C. ANDERSON

BY A. G. Douvas
ATTORNEY

Oct. 26, 1954 N. C. ANDERSON 2,692,574

APPARATUS FOR PRODUCING PHOTOCONDUCTIVE CELLS

Filed June 28, 1951 2 Sheets-Sheet 2

INVENTOR
N. C. ANDERSON

BY A. G. Douvas
ATTORNEY

Patented Oct. 26, 1954 2,692,574

UNITED STATES PATENT OFFICE 2,692,574

APPARATUS FOR PRODUCING PHOTOCONDUCTIVE CELLS

Norman C. Anderson, Auburndale, Mass., assignor to Electronics Corporation of America, a corporation of Massachusetts Application June 28, 1951, Serial No. 234,130

6 Claims. (Cl. 118—49)

This invention relates to new and improved apparatus for simultaneously photosensitizing and depositing relatively large surfaces of lead sulfide, commonly called mosaics, to flat supporting structures.

The principal object of this invention is the fabrication of mosaic surfaces of lead sulfide having controllable square area resistance, signal sensitivity, and/or signal-to-noise ratio.

Another object of this invention is to provide uniform response characteristics for the incremental areas comprising a lead sulfide mosaic surface.

Another object of this invention is to improve operator control over the physical parameters which determine the operating characteristics of photosensitized lead sulfide.

The photoconductive properties of natural lead sulfide or galena have been known for quite some time. However, the attainment of an activated form of lead sulfide having a practical sensitivity value, as well as other desirable properties, is a relatively recent development owing in a large part to the requirements of the Armed Forces for a radiation detector which is responsive to infrared radiant energy.

Two methods have been successfully used in the prior art to photosensitize lead sulfide, one being generally characterized as an all-liquid method, and the other as involving the heat treatment of lead sulfide in an atmosphere of oxygen. In the latter method, with which the apparatus of this invention is concerned, a prepared portion of inactivated lead sulfide is placed in a vessel having a controllable oxygen pressure and is therein subjected to heat, whereby the lead sulfide is transformed into a highly sensitive photoconductive material.

In the preferred application of the second method, the prepared portion of lead sulfide is evaporated from a source plate by the heat source and deposited directly in the form of an adhering coat to a photocell lead sulfide supporting structure, thereby providing an extremely economical way for fabricating photoconductive cells. This source plate is preferably prepared by depositing by chemical means a film of known and controllable thickness to a surface of said plate.

The operative characteristics and properties required of photoconductive cells vary widely, depending upon the application contemplated. In certain installations the highest possible signal sensitivity is required, whereas the value of the signal-to-noise ratio is unimportant. In other installations the highest possible signal-to-noise ratio is required and sensitivity is unimportant. In all applications, however, it is usually desirable that the output impedance of the photoconductive cells substantially match the input impedance of the amplifying apparatus to which the photocells are to be connected, otherwise considerable signal attenuation will result.

The attainment of the required characteristics is best accomplished by the monitoring and control of certain physical parameters during activation of lead sulfide by the aforementioned heating and gaseous oxidation steps. In particular, the resistance of a surface of lead sulfide deposited by evaporation should be continually monitored so that the evaporation may be terminated when the required resistance is attained. Furthermore, the temperature of the deposition surface and the oxygen pressure to which the lead sulfide is subjected during evaporation directly affect the characteristics of the deposited surface of lead sulfide. Generally speaking, if optimum signal-to-noise ratio is required, it is necessary that evaporation take place within a vessel having a relatively higher oxygen pressure and a relatively lower deposition surface temperature; whereas, if optimum signal sensitivity is required, the pressure-temperature requirements are reversed.

Accordingly, this invention contemplates improved apparatus for depositing and photosensitizing lead sulfide surfaces, particularly mosaic, of controllable characteristics. In particular, a flat lead sulfide source plate, in the preferable form of a circular or square disc, is located at an accurately spaced distance from the deposition surface of a parallel disposed target plate. This target plate is also preferably circular or square. After deposition and photosensitization of a lead sulfide surface upon the target plate, the target plate may be incorporated into a photoconductive cell structure requiring a relatively large, flat, active surface.

The temperature of the deposition target plate is controlled by a thermally coupled heater assembly, and a resistance disc in direct contact with the target plate provides a means for continually measuring the actual temperature of the target plate.

A plurality of spaced electrodes are applied to the surface of the target plate so that continual resistance measurements of the lead sulfide deposited on the surface of the target plate can be made during evaporation and deposition.

The source and target plates, as well as other necessary components, are located within a hermetically sealed vessel of new design so that oxygen pressure control is facilitated.

Heretofore, the deposition of relatively large surfaces of lead sulfide has been relatively impractical because of the lack of uniformity of response of the various incremental areas of the larger surface. It has been found that if the temperature of the deposition surface is kept uniform, improved consistency in the characteristics of a deposited surface will be attained. The apparatus of this invention accomplishes this result by thermally coupling an improved sandwich type heater source to the target plate.

In order that all of the features of this invention and the mode of operation thereof may be readily understood, a detailed description is set forth hereinafter, with particular reference being made to the drawings, wherein.

Figure 2:
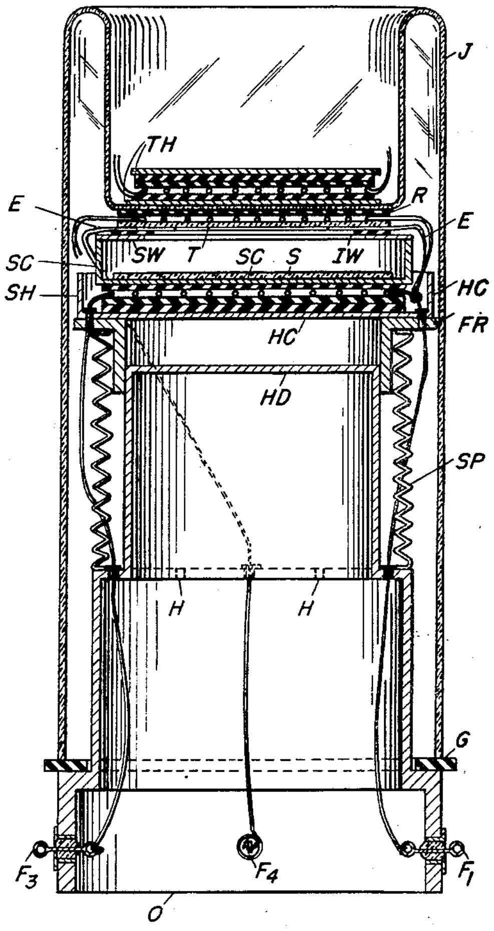
Fig. 2 is a front sectional view of the apparatus shown in Fig. 1.

Referring now to the drawings, and in particular to the sectional view shown in Fig. 2, the primary operative function of the apparatus of this invention is to deposit a thin layer of photosensitized lead sulfide having controllable characteristics upon the lower surface of target plate T from source plate S. It is contemplated that target plate T, after deposition and photosensitization have occurred, will be utilized in a photoconductive cell requiring a relatively large, flat, photosensitive surface. Source plate S is preferably of lime glass or any harder glass, and a thin adhering coat of inactivated lead sulfide is deposited on the top surface thereof by conventional evaporation or chemical deposition methods prior to its positioning within metallic source cup SC. Metallic supporting washer SW prevents insulating washer IW, electrodes E, target plate T, and resistance element R from falling into source cup SC.

Figure 3:
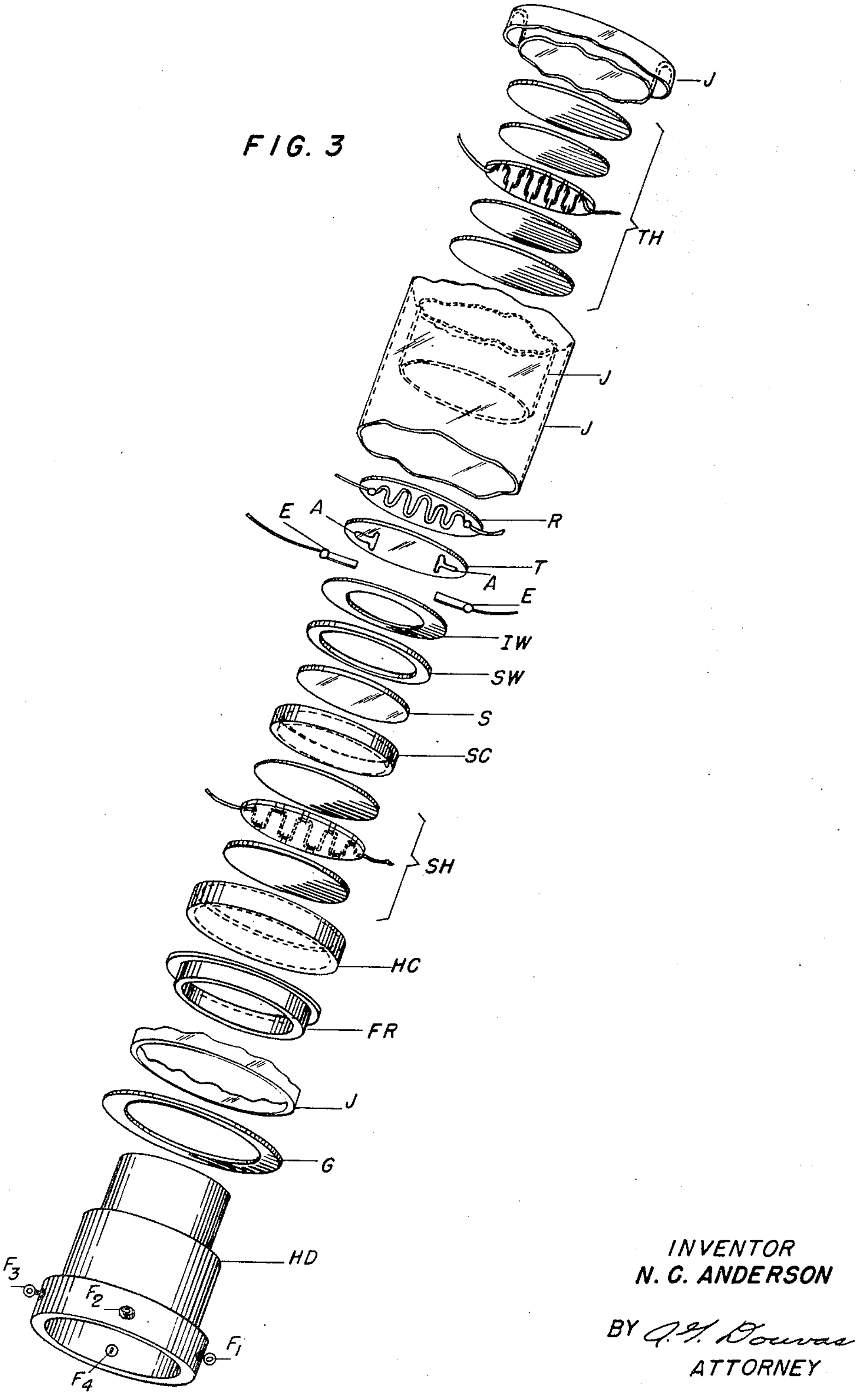
Fig. 3 is an exploded view showing in detail the structure of the individual components of the apparatus of Figs. 1 and 2.

A plurality of aquadag electrodes are painted directly to the bottom surface of target plate T. The physical disposition of these electrodes is clearly shown in the exploded view of Fig. 3. Two platinum foil strip electrodes E make pressure contact with respective ones of said aquadag electrodes so that the resistance of the lead sulfide film deposited to the lower surface of target plate T can be continually monitored during the photosensitization and deposition steps. Insulating washer IW prevents the electrodes E from being shorted to one another by metallic support washer SW.

Thermal resistance element R is in direct physical contact with the top surface of target plate T. This resistance element comprises a platinum resistance grid, shown in Fig. 2, painted on a thin supporting disc of mica. Inasmuch as the painted platinum resistance element is in direct contact with the top surface of target plate T, any temperature variations in target plate T will effectuate a corresponding resistance change in resistance element R. Resistance element R may, therefore, be connected as a conventional thermal coupling element so that the temperature of target plate T may be continually monitored during the deposition and photosensitization steps.

Source cup SC and the components supported thereby rest directly upon the top mica disc of source heater SH whereby the temperature of source plate S is directly affected by source heater SH. Source heater SH comprises a top and bottom mica disc sandwiching a central mica disc which supports a conventional resistance heater element. Source heater SH is positioned loosely within metallic heater cup HC.

Target heater TH is located within the reentrant cup portion of bell jar J so that target plate T may be heated thereby. In particular, target heater TH comprises top and bottom circular, metallic discs sandwiching a heater assembly having a construction similar to that of source heater SH. The high thermal conductivity of the bottom metallic disc provides for the uniform heating of the incremental areas of target plate T with a resulting uniformity in the operating characteristics thereof.

Heater cup HC is permanently fixed to flange ring FR, which ring is slidably mounted upon the upper portion of metallic evaporation head HD. Evaporation head HD comprises three cylindrical body portions of different diameters which are interconnected by two circular step portions. Springs SP are supported by the upper step portion so that they may exert a force against the flange portion of flange ring FR. A plurality of insulating grommets are also located in this step portion so that the electrical conductors for the various components of the apparatus may be connected to feed-through insulators $F_1$ to $F_4$ without being shorted by metallic head HD.

Reentrant bell jar J and gasket G are supported by the lower step portion of head HD so that the inner portions of bell jar J will be hermetically sealed when end opening O of head HD is connected to conventional evacuating apparatus. In particular, springs SP permit the bottom portion of bell jar J to sink deeply into gasket G, thereby forming an air-tight seal in response to the downwardly directed force applied to jar J by the external air pressure during evacuation.

Figure 1:
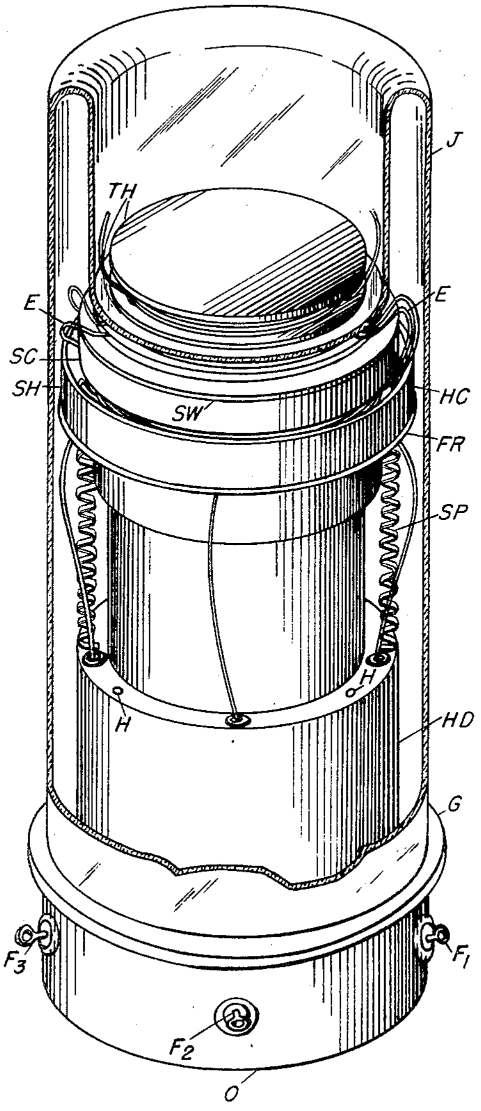
Fig. 1 is a perspective view of a preferred embodiment of the mosaic evaporation apparatus of this invention.

One terminal of thermal resistance R, one foil strip of electrode E, and one terminal of source heater SH are commonly connected to feed-through insulator $F_1$. The remaining terminal of source heater SH is connected to feed-through insulator $F_3$, and the other foil strip electrode E is separately connected to feed-through insulator $F_4$. The remaining terminal of resistance element R is connected to feed-through insulator $F_2$ shown in Fig. 1.

The detailed operation of the structure of this invention during the photosensitization and deposition of lead sulfide from source plate S to target plate T is as follows. Initially, bell jar J and supporting washer SW, including the structure supported thereby, are removed and source plate S is placed within source cup SC. Source plate S should be positioned so that the upper surface thereof is the one that is coated with lead sulfide. Thereafter, supporting washer SW is placed over support cup SC as shown in the drawing. Insulating washer IW is then placed directly upon the upper surface of support washer SW. Foil electrodes E are then located upon the upper surface of insulating washer IW so that when target plate T is placed thereupon, electrode E make contact with the aquadag electrodes A painted on the lower surface of target T. Thermal resistance element R is thereafter placed upon target plate T so that the platinum resistance grid of resistance element R makes direct contact with the upper surface of target plate T. Bell jar J is then placed over the entire structure so that the bottom portion thereof makes contact with gasket G as shown in Fig. 2. It will be noted that the weight of bell jar J and target heater TH will be sufficient to cause compression in springs SP whereby the bottom portion of bell jar J will sink slightly into gasket G.

The bottom portion of metallic head HD, including end opening O, is coupled to conventional evacuating apparatus by means not shown in the drawing. In addition, the evacuating means should be coupled to a conventional filling arrangement whereby the inner portion of head HD may be supplied with a controlled amount of oxygen gas. The vapor pressure within head HD is transmitted to the captive volume between bell jar J and the outer wall of head HD by a plurality of small holes H.

An energizing source is connected to the end terminals of target heater TH so that the element thereof may be heated. The same or a similar energizing source is also connected to feed-through insulators $F_1$ and $F_3$ whereby source heater SH is also heated. It is desirable that means be provided in the heater energizing source or sources whereby the amount of current flowing through the heater windings may be controlled.

Conventional means for measuring resistance, such as an ohmmeter, is connected directly to feed-through insulators $F_1$ and $F_4$ whereby the resistance measured between the aquadag electrodes on the lower surface of target plate T is continually monitored during the deposition of lead sulfide to this surface from source plate S.

The temperature of target plate T is continually monitored by connecting conventional apparatus to feed-through terminals $F_1$ and $F_2$ whereby the resistance changes of thermal resistance element R may be translated into temperature readings.

With this arrangement, the resistance of the lead sulfide deposited upon target plate T may be continually monitored so that source heater SH may be deenergized when sufficient evaporation of lead sulfide has occurred and the required resistance attained. Likewise, the temperature of target plate T during deposition may be accurately controlled in response to the measurements provided by thermal resistance element R. Generally speaking, if the temperature of target plate T is below that required, greater current should be applied to target heater TH, while if a reverse condition exists the current supplied to target TH should be reduced. It should be understood, however, that the heat supplied by both source heater SH and target heater TH determines the temperature of target plate T. It is preferable, however, that source heater SH be adjusted so that sufficient evaporation occurs within a reasonably short time interval and that target heater TH be energized by sufficient current to bring the temperature of target plate T up to a required value.

It is to be understood that the above-described arrangements are illustrative of the application of the principles of this invention. Numerous other arrangements may be devised by those skilled in the art without departing from the scope of the invention.

What is claimed is:

1. Lead sulfide photosensitization and deposition apparatus comprising, a lead sulfide source plate, a sandwich type heater assembly thermally coupled to said source plate, a target plate disposed in a spaced, parallel relationship with respect to said source plate, said target plate having a plurality of spaced electrodes applied to the target surface exposed to said source plate, temperature monitoring means comprising a flat resistance element, the resistance of which is a function of its temperature, in direct contact with the flat surface of said target plate not having said applied electrodes, means for evacuating and filling with oxygen the volume occupied by the aforementioned apparatus, and a sandwich type heater assembly thermally coupled to said target plate.

2. Apparatus of claim 1 wherein said target plate has an area of several square inches.

3. Lead sulfide photosensitization and deposition apparatus comprising, a lead sulfide source having a flat evaporation surface, a lead sulfide deposition structure having a flat deposition surface, a plurality of spaced electrodes contacting said deposition surface whereby the electrical impedance of a deposited film of lead sulfide interconnecting said electrodes can be monitored during deposition, a resistance element having a resistance responsive to temperature changes thermally coupled to said deposition structure whereby the temperature of said deposition structure can be monitored during deposition, means for evacuating and filling with oxygen the volume occupied by the aforementioned apparatus, and means for heating said lead sulfide source and deposition structures.

4. Apparatus of claim 3 wherein said deposition surface has an area of several square inches.

5. Lead sulfide photosensitization and deposition apparatus comprising, a metallic head having a plurality of cylindrical body portions interconnected by a plurality of circular step portions, said head having a plurality of evacuating and filling holes located through a first one of said step portions and an opened end portion suitable for connection to evacuation and filling apparatus, a reentrant bell jar partially enclosing said metallic head and being hermetically sealed to a second one of said step portions, a flange ring slidably mounted around the upper cylindrical body portion of said head, a source plate heater assembly mounted upon said flange ring, a lead sulfide source plate mounted directly over said source plate heater assembly, a target plate mechanically spaced a relatively short distance from said source plate, said target plate having a plurality of electrodes applied to the bottom surface of said plate, temperature monitoring means comprising a flat resistance element, the resistance of which is a function of its temperature, mechanically coupled directly to the top surface of said target plate, a plurality of springs forcing said flange ring upwardly until said thermal resistance disc contacts the bottom of the reentrant portion of said bell jar, and a target plate heater assembly positioned within the reentrant portion of said bell jar.

6. Apparatus of claim 5 wherein the bottom surface of said target plate has an area of several square inches.

References Cited in the file of this patent

UNITED STATES PATENTS

| Number | Name | Date |
|---|---|---|
| 2,439,983 | Morgan et al. | Apr. 20, 1948 |
| 2,448,516 | Cashman | Sept. 7, 1948 |
| 2,448,518 | Cashman | Sept. 7, 1948 |
| 2,453,141 | Lange | Nov. 9, 1948 |
| 2,479,540 | Osterberg | Aug. 16, 1949 |